DATA STORAGE APPARATUS
Filed Feb. 8, 1954
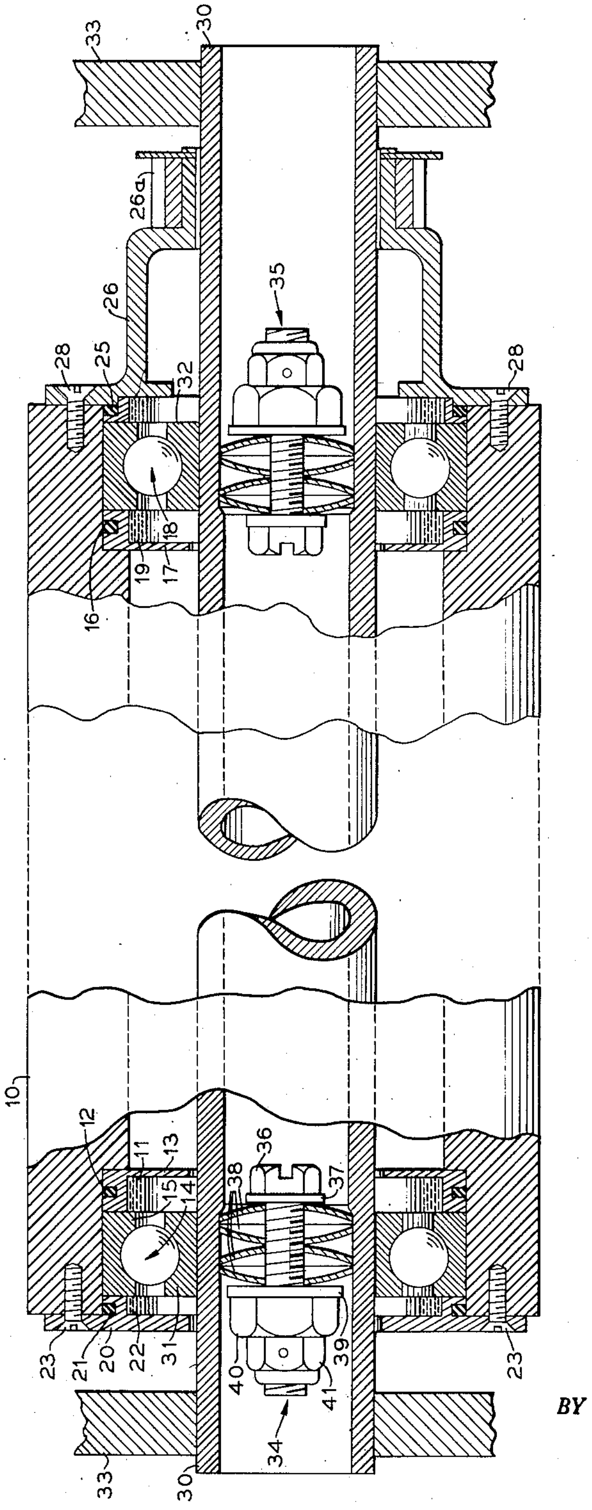
INVENTORS
EDGAR A. BROWN
CHARLES C. ZULEEG
BY Geoffrey Knight
ATTORNEY United States Patent Office 2,810,622

Patented Oct. 22, 1957

2,810,622

DATA STORAGE APPARATUS

Edgar A. Brown, Owego, and Charles C. Zuleeg, Vestal, N. Y., assignors to International Business Machines Corporation, New York, N. Y., a corporation of New York Application February 8, 1954, Serial No. 408,690

7 Claims. (Cl. 346—138)

The present invention relates to data storage apparatus and, more particularly, to the structure and assembly methods for such apparatus.

Many high-speed digital calculators utilize a rotating magnetic drum as the storage medium for information that is to be processed by the calculator. Storage devices of this type are characterized by large storage capacity and rapid access to the data stored therein.

The drum storage devices are usually rotated at high speed and generally utilize bearings in some form to facilitate their movement. It has been observed that rotatable drums as presently produced for application as storage devices have surface runouts in the order of .0007 inch. It is particularly desirable to produce a drum having a lower order of eccentricity to enable more suitable adjustment of the recording and reading transducing devices associated with the drum storage devices. Methods presently used in the production of drum storage devices require extreme precision manufacture of the bearing mountings and a part selection of commercially available bearings, in order to obtain the desired assembly. This process is impractical and costly.

What is needed at the present time is a new approach to the above problem which will enable an economic and practical method of producing a drum having runout in the order of .000025 inch, and it is the prime object of this invention to meet that need.

A further object of the present invention is to provide adjusting means which will enable the assembly of a drum storage device possessing an extremely low runout characteristic.

A further object of the present invention is to provide auxiliary means for lubrication of the bearings.

A further object of the present invention is to provide a bearing mounting scheme which insures rigid attachment of the bearing inner and outer raceways to their respective mounting members.

Another object of the present invention is to provide a method for assembling and adjusting a magnetic drum storage device.

According to the embodiment of the invention disclosed herein a magnetic drum storage device is arranged to revolve on bearing devices positioned on a rigidly positioned hollow shaft. A pair of expander devices are placed within the hollow shaft, one at each end. The expander devices provide a simple and effective means of adjustment for the purpose of removing the looseness of commercially available bearing devices. The method of adjustment employed herein enables the assembly of a drum storage device having an extremely low runout characteristic.

A further feature of the invention is the provision of auxiliary lubrication means for the bearing devices, which assures a longer lubrication life than is otherwise possible by the lubrication means self contained within each bearing device. Another advantage achieved by the preferred embodiment of the invention is the minimizing of the mass of the storage device to be rotated.

Other objects of the invention will be pointed out in the following description and claims and illustrated in the accompanying drawing, which discloses, by way of example, the principle of the invention and the best mode, which has been contemplated, of applying that principle.

The single figure of the drawing is a side elevation of a drum embodying the invention, with parts broken away.

The structure of the drum storage device and method of assembly will now be described in detail with reference to the drawing. The drum comprises a cylindrical member 10 having a peripheral surface adapted for machining and plating. The cylindrical member 10 is counterbored a predetermined distance at both ends. Viewing the left end of the drum, a rubber sealing ring 12 is located within a groove in the grease retaining member 13. The grease retaining member 13, containing a quantity of grease 11, is then pressed into the counterbored portion of member 10 so as to abut the bottom of this portion. A ball bearing and race assembly 14 is then pressed into the counterbored portion of member 10 so that the outer race 15 has a rigid relationship with member 10.

In a similar manner, at the right end of the drum, the rubber sealing ring 16 located within a groove in the grease retaining member 17, a quantity of grease 19, and the bearing and race assembly 18 are located within the counterbored portion of the right end of member 10.

Referring now to the left-hand end of the drum shown by the drawing, a grease retaining end plate 20 having a rubber sealing ring 21 thereon is partially filled with grease 22 and positioned as shown at the end of cylindrical member 10. The grease retaining end plate 20 is firmly attached to the cylindrical member 10 by means of a plurality of screws 23.

Referring now to the right-hand end of the drum, an end plate and pulley member 26 having a rubber sealing ring 25 thereon is partially filled with grease 27 and positioned at the end of cylindrical member 10 so that the grease 27 is adjacent to the bearing and race assembly 18. Member 26 is firmly attached to the cylindrical member 10 by a plurality of screws 28. The portion **26*a* of the end plate and pulley member 26** is a serrated portion adapted to receive a belt connected with a suitable driving means.

A hollow shaft 30 having each end counterbored a predetermined distance is slidably positioned within the inner races 31 and 32 of the bearing and race assemblies 14 and 18, respectively, as shown in the drawing. The ends of shaft 30 are then rigidly positioned in a supporting frame 33 so as to hold the drum and shaft assembly in horizontal position. Expander assemblies 34 and 35 are then placed within the counterbored portions of hollow shaft 30.

The expander assembly 34 consists of a bolt 36, a washer 37, two pairs of curved discs 38, with the concave surfaces of each pair facing each other, a washer 39, a large nut 40, and a smaller nut 41 which is pinned to the bolt 36. The expander assembly 34 is adapted to slidably fit into the counterbored portion of the left end of shaft 30. The expander assembly 35 is identical in structure to expander assembly 34 and is adapted to fit into the counterbored portion of the right end of shaft 30.

The drum assembly as described above is now in readiness for adjustments to reduce the internal looseness of the bearing and race assemblies 14 and 18. The adjustment procedure will hereinafter be described in detail.

For purposes of description, it may be assumed that the adjustment procedure will commence on the left-hand end of the drum assembly. A combinational socket wrench assembly is inserted into hollow shaft 30 so as to engage the nuts 40 and 41. Nut 41 is held firmly as nut 40 is turned to apply pressure to the two pairs of discs 38 thereby causing the periphery of each of the discs 38 to be forced radially outward. The peripheries of the discs 38 will engage the inner surface of the hollow shaft 30 and deflect the wall of the shaft 30 so as to engage the inner race 31 of the bearing and race assembly 14. A backward and forward pressure is manually applied in a lateral direction to the drum which will cause the inner races 31 and 32 of the bearing and race assemblies 14 and 18 to slide on the shaft 30. The take-up on nut 40 is slowly continued until the wall of shaft 30 has been deflected sufficiently to engage the inner race 31 so as to prevent lateral movement of the drum assembly on shaft 30. Nut 40 is then turned in the counter direction so as to release the pressure applied to the discs 38 and permit the drum assembly to again slide on shaft 30. The amount of counter rotation of nut 40 to release the pressure applied by discs 38 is noted.

The same take-up procedure as described above is now performed for the right-hand expander assembly 35. The pressure on the right-hand expander assembly 35 is not released. The take-up procedure is again applied to the left-hand expander assembly 34 so as to restore the noted amount of pressure released by the counter movement of nut 40. Now approximately the same pressure is applied to both of the inner races 31 and 32 so as to prevent lateral and torsional movement of the drum assembly along and about shaft 30.

The next phase of adjustment is for the purpose of reducing the internal looseness of the bearing and race assemblies, which will now be described in detail. Any suitable deflection indicating gauge may be placed in contact with the uppermost surface of the drum assembly and at the left-hand end. A vertically upward pressure is applied to the lowermost surface of the drum surface at the left-hand end which is slightly in excess of the load supported by the bearing. The perceptive movement is noted by observation of the deflection gauge. This free movement is generally of the order of .0002 inch. The take-up of nut 40 of the expander assembly 34 is again increased in small increments. After each incremental adjustment the vertically upward pressure slightly in excess of the load supported by the bearing is intermittently applied to the lowermost surface of the drum assembly and the amount of free deflection of the drum assembly is noted on the deflection gauge. This process of adjustment is repeated until the noted free movement has been reduced to an order of .00003 inch.

The process of adjustment for the purpose of reducing the internal looseness of the bearings is performed for the right-hand end of the drum assembly in the same manner as described above.

Whereas the above-described process of adjustment serves to reduce the internal looseness of the bearing and race assemblies, it should be pointed out that there is no deterioration in the performance of the bearings operating under the adjusted conditions.

The drum is now ready for a finish machining operation. The drum assembly is rotated about its own shaft mounting during the machining operation. By machining the periphery of cylindrical member 10 after the drum has been essembled on its own shaft in accordance with the above-described assembly and adjusting process, the maximum runout of the entire surface of the drum may be held in order of .000025 inch. The periphery of member 10 is now plated with material having excellent magnetizable qualities, as for example, cobalt and nickel. The drum as completely assembled and adjusted is now ready for adapting it to use in calculating machines and the like.

Thus, it should be apparent that the procedure of assembling and adjusting the drum in accordance with the above-described method produces a drum having a magnetizable surface with extremely low runout characteristics. Drums of this type are particularly desirable for use in machines utilizing magnetizable drum storage devices.

During the intervals that the drum is being driven in a rotary manner about its own shaft, the oil, which is contained in the grease located in the grease retainers, will centrifuge out of the grease and provide an oil reservoir at each side of the bearing and race assemblies 14 and 18. This will assure longer operating life for the drum assemblies.

It may be noted that since the shaft assembly does not rotate there is a considerable reduction in the mass which is to be revolved. This has certain advantages such as reducing the load on the driving motor and the bearings.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intenion, therefore, to be limited only as indicated by the scope of the following claims.

What is claimed is:

1. A data storage drum assembly comprising a cylindrical member coated with a peripheral layer of magnetizable material, a hollow shaft having a continuous annular section located within said cylindrical member, bearing means intermediate to said hollow shaft and said cylindrical member, adjustable means located within said hollow shaft for uniformly and radially deflecting said hollow shaft so as to regulate the looseness of said bearing means, and a member attached to one end of said cylindrical member adapted for engagement with a driving means to rotate said cylindrical member about said hollow shaft.

2. In a device of the class described, a rotary member, a stationary hollow shaft having a continuous annular section located within said member, bearing means between said hollow shaft and said rotary member for supporting the member upon the shaft, and expansible means within said hollow shaft in alignment with said bearing means adjustable to uniformly and radially strain said shaft and bearing means to reduce the bearing looseness to less than the looseness therein when unstrained.

3. The method of assembling and adjusting a data storage drum comprising the steps of pressing bearing and race assemblies within both ends of a cylindrical member so as to provide a rigid engagement between the inner surface of said cylindrical member and the outer race of said bearing and race assembly, slideably placing a hollow shaft within the inner races of the bearing and race assemblies, rigidly supporting the ends of said hollow shaft so that said hollow shaft is held in a substantially horizontal position, placing expanding means within said hollow shaft in alignment with the bearing and race assemblies, adjusting one of said expanding means so as to deflect said hollow shaft into a sufficient engagement with the inner race of said aligned bearing and race assemblies to prevent lateral movement of the cylindrical member and bearing assembly along said hollow shaft, releasing said adjusted expanding means and noting the amount of releasing adjustment to enable lateral movement of the cylindrical member and bearing assembly along said hollow shaft, adjusting the second of said expanding means so as to deflect said hollow shaft into a sufficient engagement with the inner race of the second said aligned bearing and race assembly to prevent lateral movement of the cylindrical member and bearing assembly along said hollow shaft, restoring the adjustment of said first adjusted expanding means an amount equal to the noted amount of releasing adjustment, placing a deflection gauge in contact with the uppermost surface of said cylindrical member and in proximity of the end of said cylindrical member, applying a vertically upward pressure to the bottommost surface of said cylindrical member and noting the deflection indicated by said gauge, readjusting one of said expanding means to further deflect said hollow shaft so as to reduce the amount of upward and downward movement to an order of approximately .00003 inch as noted by said deflection gauge when said upward pressure is intermittently applied to the bottommost surface of said cylindrical member, placing said deflection gauge in contact with the uppermost surface of the other end of said cylindrical member, applying a vertically upward pressure to the bottommost surface of said cylindrical member and noting the deflection indicated by said gauge, readjusting the other of said expanding means to further deflect said hollow shaft so as to reduce the amount of upward and downward movement to an order of approximately .00003 inch as noted by said deflecting gauge when said upward pressure is intermittently applied to the bottommost surface of said cylindrical member, finishing the outer surface of said cylindrical member by revolving said member about said hollow shaft, and coating the outer surface of said cylindrical member with a layer of magnetizable material.

4. A data storage drum as claimed in claim 1 wherein said bearing means includes an outer race, an inner race and a plurality of roller bearing elements disposed therebetween, and flange elements secured to said drum and disposed in spaced relation to said bearing means and defining an annular inwardly opening grease retaining reservoir, said flanges encompassing the major portion of said bearing means and having their inward open ends disposed adjacent said stationary hollow shaft.

5. In a rotary support, the combination of a shaft including a tubular end portion having an inner cylindrical surface, a body member surrounding said tubular end portion, bearing means having opposed bearing surfaces with an initial running clearance therebetween to permit relative rotation between said shaft and body member, a plurality of removable metallic dished discs disposed in the tubular end portion of said shaft within the confines of said bearing surfaces, and loading means for axially compressing said dished discs to radially expand the same into engagement with said tubular end and uniformly and radially expand the said tubular end to reduce the initial bearing running clearance.

6. In a rotatable support, the combination of an outer race, an inner race, a plurality of rollable bearing elements carried between said races, a body member secured to said outer race, a shaft including a tubular end portion having an inner cylindrical surface embraced by said inner race, a plurality of removable dished disc elements disposed within said tubular portion of said shaft in alignment with said inner race, and means for axially compressing said dished disc elements to radially expand the same into engagement with the inner surface of the tubular end portion of said shaft to expand the same and frictionally grip said inner race.

7. In a rotatable support, the combination of an outer race, an inner race having an inner surface, a plurality of rollable bearing elements carried between said races with an initial running clearacne therebetween, a body member secured to said outer race, a shaft having a tubular portion extending through and in engagement with the inner surface of said inner race, a plurality of metallic oppositely facing dished discs disposed in said tubular shaft within the boundary of said inner race, and means for axially compressing said dished discs to expand the same radially into engagement with said tubular shaft for applying a uniform radial expansion therethrough to said inner race, said inner race being expanded thereby to provide a reduction in the bearing clearance.

References Cited in the file of this patent

UNITED STATES PATENTS

| | | |
|---|---|---|
| 1,468,074 | Pierce | Sept. 18, 1923 |
| 1,641,059 | Tausch | Aug. 30, 1927 |
| 1,684,652 | White | Sept. 18, 1928 |
| 1,984,718 | Wistrand | Dec. 18, 1934 |
| 2,617,705 | Coombs et al. | Nov. 11, 1952 |

FOREIGN PATENTS

| | | |
|---|---|---|
| 294,667 | Great Britain | July 28, 1928 |